(12) United States Patent
Gordon et al.

(10) Patent No.: US 9,357,790 B2
(45) Date of Patent: Jun. 7, 2016

(54) PROCESSES FOR REMOVING WAXES AND PHOSPHOLIPIDS FROM VEGETABLE OILS AND INCREASING PRODUCTION OF FOOD GRADE LECITHIN THEREFROM

(71) Applicant: CAVITATION TECHNOLOGIES, INC., Chatsworth, CA (US)

(72) Inventors: Roman Gordon, Studio City, CA (US); Igor Gorodnitsky, Marina del Rey, CA (US); Maxim A. Promtov, Tambov (RU)

(73) Assignee: Cavitation Technologies, Inc., Chatsworth, CA (US)

( * ) Notice: Subject to any disclaimer, the term of this patent is extended or adjusted under 35 U.S.C. 154(b) by 427 days.

(21) Appl. No.: 14/087,455

(22) Filed: Nov. 22, 2013

(65) Prior Publication Data
US 2014/0087042 A1    Mar. 27, 2014

Related U.S. Application Data (63) Continuation-in-part of application No. 12/883,328, filed on Sep. 16, 2010, and a continuation-in-part of application No. 12/484,981, filed on Jun. 15, 2009.

(51) Int. Cl.
| | |
|---|---|
| A23D 9/04 | (2006.01) |
| C11B 3/04 | (2006.01) |
| C11B 3/06 | (2006.01) |
| B01F 5/06 | (2006.01) |
| B01J 10/00 | (2006.01) |
| B01J 19/00 | (2006.01) |
| B01J 19/02 | (2006.01) |
| B01J 19/24 | (2006.01) |
| B01F 13/10 | (2006.01) |
| C11B 3/00 | (2006.01) |
| C11B 3/16 | (2006.01) |
| C11C 3/00 | (2006.01) |
| A23J 7/00 | (2006.01) |

(52) U.S. Cl.
CPC ... *A23D 9/04* (2013.01); *A23J 7/00* (2013.01); *B01F 5/0644* (2013.01); *B01F 5/0646* (2013.01); *B01F 5/0652* (2013.01); *B01F 5/0653* (2013.01); *B01F 5/0682* (2013.01); *B01F 5/0688* (2013.01); *B01F 13/1025* (2013.01); *B01F 13/1027* (2013.01); *B01J 10/002* (2013.01); *B01J 19/008* (2013.01); *B01J 19/0066* (2013.01); *B01J 19/02* (2013.01); *B01J 19/2415* (2013.01); *C11B 3/001* (2013.01); *C11B 3/005* (2013.01); *C11B 3/006* (2013.01); *C11B 3/04* (2013.01); *C11B 3/16* (2013.01); *C11C 3/003* (2013.01); *B01J 2219/0218* (2013.01); *B01J 2219/0231* (2013.01); *B01J 2219/0245* (2013.01)

(58) Field of Classification Search
None
See application file for complete search history.

(56) References Cited

U.S. PATENT DOCUMENTS

| | | | | |
|---|---|---|---|---|
| 4,698,185 | A  * | 10/1987 | Dijkstra | C11B 3/06 554/176 |
| 6,172,248 | B1 * | 1/2001 | Copeland | A23D 9/00 554/190 |
| 6,441,209 | B1 * | 8/2002 | Copeland | A23D 9/00 554/83 |
| 8,232,418 | B1 * | 7/2012 | Bilbie | C07F 9/103 554/83 |

* cited by examiner

*Primary Examiner* — Randy Boyer
(74) *Attorney, Agent, or Firm* — Kelly & Kelley, LLP (57) ABSTRACT

A process for removing impurities from a crude vegetable oil. The process involves mixing the crude vegetable oil with removal reagents and pumping the mixture through a multi-stage, hydrodynamic cavitation device. The mixture is subjected to hydrodynamic cavitation processes, which result in the repeated generation and collapsing of vapor bubbles of volatile components in the process fluid, leading to the formation of an emulsion of vegetable oil and a water-phase from the process fluid into an emulsion. The water-phase contains the impurities. The vegetable oil and water-phase are then separated. Lecithin may be made from the phospholipids in the water-phase after appropriate drying processes.

6 Claims, 8 Drawing Sheets

Quality parameters of nano-cold refined SF oil samples, the set of samples delivered during week 8 (origin:CTI)

| Sample | Feedstock | Sample 15 | Sample 15A | Sample 15B | Sample 16 | Sample 16A | Sample 16B | Sample 17 |
|---|---|---|---|---|---|---|---|---|
| FFA (as C 18:1), % | 1.72 | 0.11 | 0.10 | 0.10 | 0.03 | 0.05 | 0.05 | 1.79 |
| Element content (ICP), ppm | | | | | | | | |
| Ca | 32.7 | 8.2 | 8.4 | 8.9 | 5.5 | 5.7 | 4.8 | 27.0 |
| Fe | 0.9 | 0.3 | 0.3 | 0.3 | 0.1 | 0.1 | 0.1 | 0.5 |
| K | 2.9 | 0.9 | 0.8 | 0.5 | 0.9 | 1.1 | 1.2 | 1.9 |
| Mg | 15.8 | 4.0 | 3.7 | 3.5 | 1.9 | 1.6 | 1.2 | 8.5 |
| Na | 4.8 | 68.4 | 53.6 | 41.7 | 53.2 | 48.9 | 42.2 | 4.4 |
| P | 53.4 | 11.2 | 11.6 | 11.3 | 5.4 | 4.2 | 3.2 | 19.3 |
| [1] Wax content, ppm | 335 | 5 | N.D. | N.D. | N.D. | N.D. | N.D. | 112 |
| Colour, Lovibond 1" | - | 2.0R/9.2Y | 1.2R/9.2Y | 1.3R/9.1Y | 1.6R/8.9Y | 1.4R/8.6Y | 1.4R/8.4Y | 2.0R/27Y |
| Lovibond 5 1/4" | - | - | - | 6.6R/73Y | - | - | - | - |
| Soaps (as Na-oleate), ppm | - | 1282 | 913 | 711 | 1164 | 1118 | 700 | 0 |

[1] wax content was analyzed according to an in-house method based on the difference in turbidity of hot oil (130 °C) and cold oil (cooled for 60 minutes at 5.5 °C). Prior to this analyze, all sunflower oil samples were treated with: 0.9 kg of citric acid/ton oil, 3 kg TriSyl 300/t oil and 20kg Tonsil Optimum 210FF/ton; N.D. - Not Detectable

FIG. 14

|  | "P" input (ppm) | "P" output (ppm) |
| --- | --- | --- |
| Water degumming without Nanocavitator | 400-600 | 110-120 |
| Water degumming with Nanocavitator | 400-600 | 25-30 |

FIG. 15

| Sample | "P" (ppm) |
| --- | --- |
| Input centrifuge 18 a 06 hs. 09,10/04/13 | 404 |
| Output centrifuge 23:00 hs. 09/04/13 | 22.3 |
| Output centrifuge 01:00 hs. 10/04/13 | 19.1 |
| Output centrifuge 05:00 hs. 10/04/13 | 19.9 |
| Output centrifuge 18 a 6 hs. 09-10/04/13 | 23.1 |

FIG. 16

| Sample | "P" (ppm) |
| --- | --- |
| Input centrifuge 6 a 18 hs. 18/04/13 | 443 |
| Output centrifuge 13:00 hs. 18/04/13 | 22.0 |
| Output centrifuge 15:00 hs. 18/04/13 | 14.1 |
| Output centrifuge 17:00 hs. 18/04/13 | 19.7 |
| Output centrifuge 6 a 18 hs. 09-10/04/13 | 24.6 |

PROCESSES FOR REMOVING WAXES AND PHOSPHOLIPIDS FROM VEGETABLE OILS AND INCREASING PRODUCTION OF FOOD GRADE LECITHIN THEREFROM

FIELD OF THE INVENTION

The present invention is directed to a process for the treatment of vegetable oils during conventional dewaxing, water degumming or chemical refining processes. More particularly, the present invention is directed to a process for the removal of solid particulate, higher melting glycerides in vegetable oils at ambient or substantially higher temperatures. The process of the present invention is useful for dewaxing a vegetable oil, but also for removing a phospholipid or free fatty acid such as lecithin from a crude vegetable oil.

BACKGROUND

Vegetable oils when subjected to low temperature environments undergo solidification through crystallization and therefore are a major hurdle for use in industrial applications. The relatively poor low temperature flow properties of vegetable oils arise from the appearance of waxy crystals that rapidly agglomerate resulting in the solidification of the oil.

This invention relates to a method of dewaxing and degumming vegetable oils to avoid this crystallization. More particularly, the present invention is concerned with a method of removing a wax and phospholipid from a vegetable oil through processing in a multistage flow-through, hydrodynamic cavitation device.

Waxes are natural components of many vegetable oils, including sunflower oils, consisting mainly of esters of fatty acids with fatty alcohols, that are partially removed in winterization processes during oil refining. The quality and stability of vegetable oils such as sunflower oil are influenced by the presence of minor constituents such as waxes. Waxes are mainly esters of FA with fatty alcohols, having 36 to 50 carbon atoms. Waxes tend to crystallize and cause turbidity when the oil is cooled, interfering with oil processing and marketing. They are partially removed during refining in the winterization or dewaxing process, which is carried out in order to obtain completely clear oil that is not affected by low storage temperatures.

A method for purifying vegetable oils obtained by mechanical extraction is disclosed in U.S. Pat. No. 6,307,077 to Quear. The vegetable oils are cooled to induce the insoluble material to agglomerate and to form larger masses of insoluble material. The crude vegetable oil is cooled to a temperature between about 5° C. and 0° C. The vegetable oil may be maintained at this cold temperature for a minimum amount of time, preferably between about 1 hour and about 8 hours. After the vegetable oil has been cooled and stored, the oil is rapidly heated so as to induce the insoluble material to precipitate out. In a preferred embodiment, the vegetable oil is heated to temperature between about 50° C. and about 80° C.

Prior to human consumption, vegetable oil undergoes processing which generally includes bleaching, deodorization and the removal of unwanted particulate material. The unwanted particulate material includes wax, which shall mean for the purposes herein high melting glycerides such as saturated glycerides having 16 to 18 carbons. The oil dewaxing equipment is used in oil refining process for oil with high wax content as well as some salad oils. The oil needing dewaxing includes corngerm oil with a wax content typically being 0.01% to 0.04%, sunflower oil with a wax content typically from 0.06% to 0.2%, ricebran oil with a wax content typically between 1% to 5% and including olive oil and walnut oil.

Typically vegetable oil is extracted from seed, refined and bleached. After bleaching, the hot oil—usually about 120° F.—is sent to a "winterization" unit. Winterization is a process by which higher-melting glycerides are crystallized for removal from the oil. Some vegetable oils require winterization and the removal of higher melting glycerides to avoid problems in the use of the oils at lower temperatures and in later processing. Other vegetable oils do not require winterization to remain processable at lower temperatures. The cooling crystallization lasts up to 48 hours.

Dewaxing (also called winterization) is carried out by slowly chilling the oil to 7-15° C. followed by filtration of precipitated solids. The cooled oil is held in a specially insulated tank with a special slow-speed mechanical agitator. Preferably, the oil is held for 12-48 hours at this temperature.

The waxes are separated from the oils by employing crystallization techniques. After the wax is crystallized, the wax is usually separated from the oils in filter presses using pre-coated plates of diatomaceous earth.

Prior to the instant invention, it was generally assumed that during winterization for the formation of wax crystals in the oils, the temperature of the oils are lowered at a slow cooling rate to allow crystallization so that a true solid liquid separation process can be effected. It has been generally believed, however, that the oil should be cooled slowly and carefully to avoid difficulty in the filtration process. This slow cooling is not energy efficient, particularly if heating is required to control the cooling rate. Further, the slow cooling of the oil slows the production of winterized refined oil.

Therefore, it is desirable to develop a process for removing waxes and other particulate materials from oils in a more efficient and less energy intensive manner.

Removal of phospholipids from oil plays an important role not only in the quality of refined food grade oil, but also in production of lecithin. Plant lecithins are a by-product of the refining of vegetable oils. During the usual batch degumming process, the crude oil is heated to about 70° C., mixed with 2% water and subjected to thorough stirring for about half an hour to an hour. This addition of water to the oil hydrates the polar lipids in the oil, making them insoluble. The resulting lecithin is then separated by centrifugation.

The lecithin is made up of water, phospholipids and glycolipids, some triglycerides, carbohydrates, traces of sterols, free fatty acids and carotenoids. The crude plant lecithin is obtained by careful drying. The composition and quality of the crude lecithin product are considerably influenced by the quality and origin of the oilseeds, as well as the conditions during the de-gumming process.

During conventional water degumming processes only hydratable phospholipids can be removed from oil. Non-hydratable phospholipids can be removed from the oil with the addition of phosphoric or citric acid.

Food grade lecithin can be obtained only if extracted from oil by the addition of water in the water degumming process but not with phosphoric or citric acid. This process limits the quantity of food grade lecithin that can be obtained from crude oil, because only hydratable phospholipids can be removed with water. If acid is added to the oil during refining it will remove remaining non-hydratable phospholipids, but these non-hydratable phospholipids are suitable only for industrial grade lecithin production and not for a food grade lecithin.

A process for treating organic acid-treated phosphatides is disclosed in U.S. Pat. No. 6,441,209 to Copeland et al. The process for treating a phosphatide-containing material disclosed by Copeland et al. involves providing a phosphatide-containing material having a phosphatide-enriched aqueous phase obtained from an organic acid refining process, an organic acid-treated phosphatide phase obtained from an organic acid refining process, or a mixture thereof; adjusting the pH of the phosphatide-containing material; and drying the neutralized phosphatide for a time sufficient to produce a dried phosphatide containing hydrolyzed lecithin.

U.S. Pat. No. 8,232,418 to Bilbie et al. discloses a method for the preparation of lecithin and involves heating the oil to a suitable temperature, contacting the oil with a peroxide solution, separating the lecithin precipitate from the oil, and drying the lecithin.

Lecithin is recognized by the FDA as GRAS, i.e. Generally Regarded as Safe, 21 CFR, 1841400, and is used as a non-toxic surfactant, emulsifier, lubricant and to produce liposomes. Commercial lecithin is a mixture of various phospholipids, such as phosphatic acid, phosphatidylethanolamine, phosphatidylcholine, and phosphatidylinositol, depending on the source and production.

In fluid processing, it is well known that localized increases in both pressure and temperature along with vigorous mixing provided by cavitation can initiate and accelerate numerous reactions and processes. Enhancing the reaction yields and process efficiencies by means of the energy released upon the collapse of cavities generated in the fluidic media has found numerous applications. Although extreme overall pressure or heat can be disadvantageous, the outcome of an optimized cavitation treatment has proven to be beneficial.

Cavitation can be of different origins, including hydrodynamic, acoustic, ultrasonic, laser-induced and generated by injecting steam into a cooled fluid. Simultaneous application of two or more cavitation-generating techniques may provide an even better outcome, i.e., coupling steam injection cavitation with acoustic cavitation improves efficiency by 16 times (Young, 1999; Gogate, 2008; Mahulkar et al., 2008).

If fluid flow is directed in a flow-through hydrodynamic cavitation apparatus at a proper velocity, the vapor-filled bubbles will form within the flow due to the drop in fluid pressure below the vapor pressure. The bubbles collapse in a slow-velocity, high-pressure zone, causing sharp localized increases in both pressure and temperature, the formation of high-velocity streams and shock waves, vigorous shearing forces, and the release of a substantial amount of energy. This process activates atoms, molecules, ions and/or radicals located in the bubbles and the surrounding liquid, and initiates chemical reactions and processes. The bubble implosion can also result in the emission of light favoring photoreactions and radical generation.

The cavitation phenomenon is categorized by cavitation number $C_v$, defined as: $C_v=(P-P_v)/0.5\rho V^2$, where P is the pressure downstream of a constriction, $P_v$ is the fluid's vapor pressure, $\rho$ is the fluid's density, and V is the fluid's velocity at the orifice. Cavitation starts at $C_v=1$, and $C_v<1$ implies a high degree of cavitation. The number of cavitation events in a flow unit is another important parameter. (Suslick, 1989; Didenko et al., 1999; Suslick et al., 1999; Young, 1999; Gogate, 2008; Passandideh-Fard and Roohi, 2008; Zhang et al., 2008)

Distinct from acoustic cavitation, flow-through hydrodynamic cavitation does not require using a vessel. Numerous flow-through hydrodynamic apparatuses are known. See, for example, U.S. Pat. No. 6,705,396 to Ivannikov et al. and U.S. Pat. Nos. 7,338,551, 7,207,712, 6502,979, 5,971,601, 5,969, 207 to Kozyuk and U.S. Pat. No. 7,762,715 to Gordon et al that disclose hydrodynamic cavitation apparatuses and their applications.

With the cost of energy and human health concerns rising rapidly, it is highly desirable to lower the level of impurities in edible oils and reduce the energy consumption of refining. The prior art techniques do not offer the most efficient method of dewaxing and degumming of vegetable oil in the shortest amount of time possible.

Therefore, a need exists for an improved method for processing vegetable oils. The inventive method and devices are desired particularly at oil refineries during harvest, when throughput is a key factor. The present invention provides such methods and devices, while producing improved product with shorter processing time and less accumulation of waste harmful to environment.

The present invention provides a method and device for generating cavitation in a flow of oil to be treated within at least one cavitation chamber, preferably in multiple consecutive cavitation chambers. This goal is achieved through the design of a cavitation device aimed at dewaxing and removal of phospholipids—a free fatty acid—from a crude vegetable oil and extracting at least 10% more of food grade lecithin.

To achieve as large a profit margin as possible it is necessary to decrease time, energy consumption and eliminate waste production of removing wax and phospholipids. The prior art methods do not offer the most efficient method in the shortest time possible. Therefore, a need exists for the improved method and device for dewaxing with a minimal residence time and energy cost that produces dewaxed oils with low levels of phospholipids. The present invention satisfies these needs and provides other related advantages.

It is an object of this invention to provide a rapid energy efficient continuous process for treating vegetable oils, which process is effective without a slow cooling of the oil, but which is economic and produces a vegetable oil that is not turbid at lower temperatures.

It is also an object of this invention to provide a process which would remove wax and phospholipids.

It is also an object to remove more phospholipids with water and a small amount of citric acid to maintain food grade lecithin production.

It is another object of this invention to reduce the time required for winterization.

It is also an object to remove hydratable and partially non-hydratable phospholipids with only water.

It is also an object to remove more phospholipids with addition of water and citric acid and maintain food grade lecithin production.

It is also an object of this invention to improve extraction of food grade lecithin by at least ten percent.

Still further objects and advantages of the invention will be found by reference to the following description.

SUMMARY OF THE INVENTION

The present invention is directed to a process for removing impurities from crude vegetable oil. The process includes the step of providing a multi-stage, hydrodynamic cavitation device. The cavitation device may include a protective barrier on an interior surface thereof. The protective barrier may be bonded to the interior surface, formed into a cage or frame that is included within a chamber or passageway on the interior of the cavitation device, or the interior surface may be made from the material of the protective barrier. The protective barrier is designed to enhance resistance of the cavitation device against corrosion from corrosive compounds involved in the removal of the impurities from the crude vegetable oil.

The process continues with mixing the crude vegetable oil with removal reagents so as to form a process fluid. The removal reagents may comprise sodium hydroxide, phosphoric acid, citric acid, or a combination thereof. Where phosphoric acid is a removal agent it preferably comprises no greater than an eight-five percent solution. The phosphoric acid may be presented in quantities representing 0.1% to 0.3% by volume of the fluidic mixture. Where the removal agent comprises citric acid, it is again preferably presented in no greater than an eight-five percent solution. Citric acid may be used in quantities from 0.1% to 1.0% by volume of the fluidic mixture. Sodium hydroxide may be used in similar concentrations and amounts.

The process fluid is pumped through the multi-stage, hydrodynamic cavitation device. The pump pressure is preferably such that the flow rate results in the repeated generating and collapsing of hydrodynamic cavitation vapor bubbles in the process fluid within the multi-stage, hydrodynamic cavitation device. The repeated generating and collapsing of cavitation vapor bubbles results in the formation of the process fluid into an emulsion. The emulsion comprises a vegetable oil phase and a water-phase, wherein the water-phase comprises the impurities. The emulsion is then separated into a vegetable oil component and the water-phase. The cavitation process and formation of the emulsion has resulted in the removal of the impurities from the crude vegetable oil and transfer of the same to the water-phase.

The impurities preferably comprise wax and phospholipids. The impurities may further comprise phosphorous, glycolipids, triglycerides, carbohydrates, sterols, free fatty acids, and carotenoids. The phospholipids may be either hydratable or non-hydratable phospholipids, or both.

The process may further comprise the step of transporting the water-phase to a drying system. In the drying system, the water-phase is dried to remove the moisture and leave the dried impurities behind. Lecithin, preferably food grade lecithin, can be produced from the dried impurities.

After the separating step, the oil may be cooled to a temperature of about five degrees Celsius for a holding time of between ten minutes and sixty minutes. The separating step may be performed by centrifugation, filtration, sedimentation, or a combination thereof.

In an alternate two-step process, the inventive method for removing impurities from crude vegetable oil performs a first hydrodynamic cavitation treatment to remove phospholipids and a second hydrodynamic cavitation treatment to remove waxes. In the first step, the crude vegetable oil is mixed with a phospholipid removal agent so as to form an initial process fluid. As described above, the phospholipid removal agent may comprise an acidic solution such as phosphoric acid, citric acid, or a combination thereof. The initial process fluid is subjected to a first hydrodynamic cavitation treatment. The cavitated initial process fluid is then separated into phospholipids and an intermediate process vegetable oil. The intermediate process vegetable oil is then mixed with a wax removal reagent so as to form an intermediate process fluid. This wax removal reagent may comprise additional water or a basic solution such as sodium hydroxide. The intermediate process fluid is then subjected to a second hydrodynamic cavitation treatment. The cavitated intermediate process fluid is cooled to at least twenty-five degrees Celsius. Preferably, the cavitated intermediate process fluid is cooled to a temperature between ten degrees and fifteen degrees Celsius, and more preferably cooled to a temperature of about five degrees Celsius. The cavitated intermediate process fluid is then subjected to a winterization process for between thirty and sixty minutes. The winterized intermediate process fluid is then separated into waxes and purified vegetable oil.

As with the single stage process, the phospholipids may be transported to a drying system where they are dried to remove excess moisture, leaving behind dried phospholipids. The dried phospholipids may then be used to produce lecithin, preferably food grade lecithin.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

With reference to the attached drawing figures, a process for removing wax and phospholipids from vegetable oils and increasing production of food grade lecithin is disclosed. More particularly, the process subjects the vegetable oils to hydrodynamic cavitation treatment.

Certain production oils contain contaminants such as wax, phosphatides, free fatty acids, sulphurous compounds, carbohydrates, liposaccharides, proteins, aldehydes, ketones, terpenes, sterols, chlorophyll, carotene and other impurities.

These contaminants need to be removed prior to subsequent processing of the vegetable oils. In addition, the contaminants are useable in other processes depending upon their purity.

The objects of the present invention are achieved by feeding fluidic oil in a flow-through hydrodynamic cavitation device, i.e., a nano cavitator, to remove wax and phospholipids from vegetable oils. Hydrodynamic cavitation results in the formation of vapor cavities in the fluid oil flow when accelerated through certain geometries. The phenomenon is called cavitation because cavities form when the fluid pressure is reduced to the vapor pressure. The cavities collapse upon reaching a downstream higher-pressure region. The collapse produces a localized increase in pressure and temperature, as well as intense shearing forces, resulting in mass transfer between the vegetable oil and a water-phase, removal of wax and phospholipids, agglomeration of solid particles, and increased chemical reactions. Ideally, hydrodynamic cavitation occurs evenly and efficiently with minimal energy expenditure.

Figure 1:
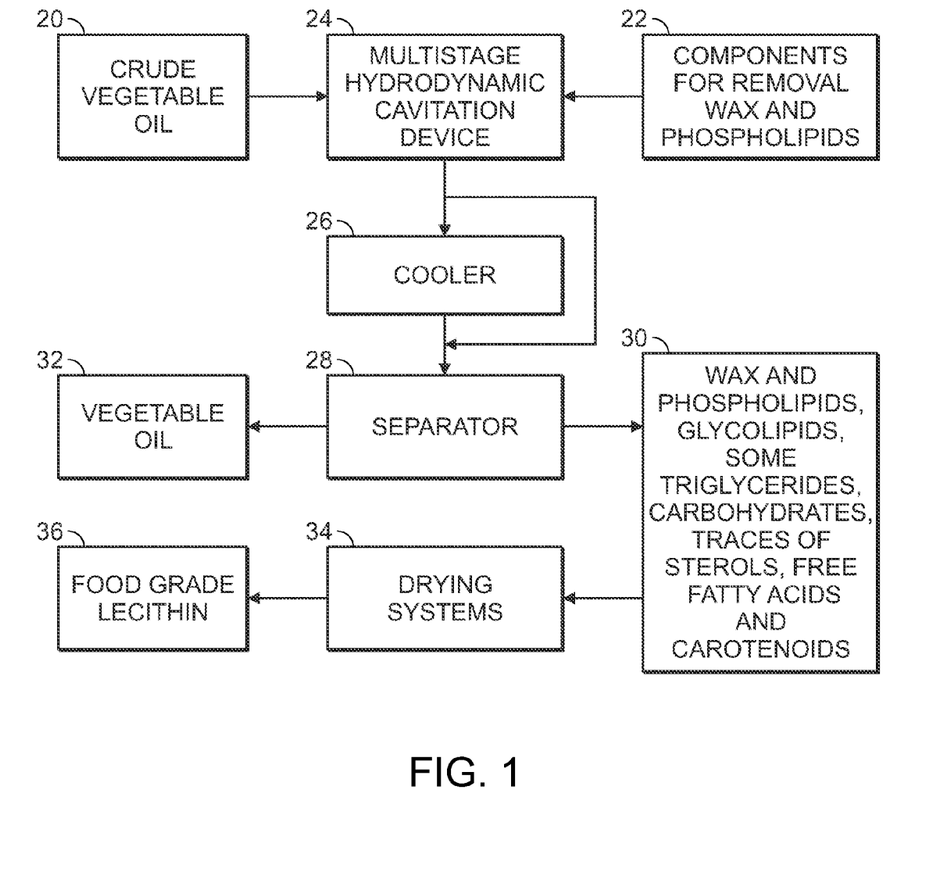
FIG. 1 is a flowchart illustrating a preferred embodiment of the inventive method.

FIG. 1 depicts a flowchart generally illustrating the inventive method. In this flow chart, the inventive method begins with the steps of providing crude vegetable oil (20), providing components promoting the removal of wax and phospholipids (22), and providing a flow-through multi-stage hydrodynamic cavitation device. For ease of reference, the components promoting the removal of wax and phospholipids will be called removal reagents. The crude oil and removal reagents are mixed and pumped (24) through the flow-through, hydrodynamic cavitation device. The mixing may occur inside or prior to the cavitation device. In the cavitation device, vegetable oil is mixed with the removal reagents and is exposed to hydrodynamic cavitation processing. A flow-through multi-stage cavitation reactor with or without a rotor-stator device can be used to generate cavitation. It can have one or more components made from or with the internal surfaces coated with a protective barrier for blocking contact with corrosive compounds in the processed fluid.

The impact of intensive hydrodynamic cavitation on the mixture of vegetable oil and removal reagents is to enhance chemical reactions, improve heat and mass transfer processes, and contribute to formation of agglomerates of solid nano- and micro-particles, including wax. In a particularly preferred embodiment, the removal reagents can be 0.1 to 0.3% by volume of an 85% phosphoric acid solution and 0.1 to 1.0% by volume of an 85% citric acid solution.

Before cavitation the fluidic mixture is heated to a temperature of about 75° C. The cavitated fluidic mixture of vegetable oil, wax, phospholipids and other oil-like colloid or solid components is cooled down in the cooling device (26). The cooling device lowers the temperature to a target of at least room temperature (20°-25° C.), or cooler to 10°-15° C., but most preferably to about 5° C., over a period of 10 to 60 minutes. The cooled fluidic mixture is then fed to a separator (28). Hydrodynamic cavitation processing intensifies the processes of forming crystals, colloids, and oil drops composed primarily of wax and phospholipids. The oil refining process can also be performed with only minimal cooling or without cooling entirely.

Inside the separator, water, oil drops, colloid and solid particles composed of wax and phosphatides as well as glycolipids, some triglycerides, carbohydrates, traces of sterols, free fatty acids and carotenoids (30), are removed from the oil (32). The oil may be subjected to further refining. In the course of cavitation treatment the vegetable oil is refined by the removal of both hydratable and non-hydratable phospholipids. Non-hydratable phospholipids can be found in the mixture of oil, water and other chemical components in the form of oil compounds, colloids, colloid agglomerates with wax crystals and other non-hydratable particles.

The process of removing water, wax, phospholipids and other colloid and solid components from the oil can be achieved by sedimentation, centrifuging or filtering. The mixture mainly composed of water and particles of wax and phospholipids is fed into a dryer (34) for dehydration and then it is subject to further processing to produce food grade lecithin (36).

The inventive process is a one-step process for the removal of wax and phospholipids from vegetable oils. The process also has the effect of increasing the production of food grade lecithin from the vegetable oils. The vegetable oils are preferably mixed with removal reagents or components promoting the removal of wax and phospholipids. This mixture is pumped in the flow-through cavitation device to produce a fine, disperse emulsion which improves the removal of wax and phospholipids from the vegetable oil. The removal process may be performed with or without cooling of the emulsion. If the emulsion is cooled, such is done for a period of time between ten minutes and sixty minutes. The cooling of the emulsion is preferably to approximately five degrees centigrade from temperatures as high as seventy-five degrees centigrade.

The removal reagents for the waxes may comprise a base such as sodium hydroxide, and for the phospholipids, an acid such as phosphoric acid and/or citric acid. The phosphoric acid is preferably used from 0.1% to 0.3% of the fluid volume with an 85% solution of phosphoric acid. Citric acid is preferably used in quantities from 0.1% to 1.0% by fluid volume with an 85% solution of citric acid. The sodium hydroxide may be used in similar concentrations and quantities. The removal of wax and phospholipids from the vegetable oil may also be accompanied by the removal of hydratable phospholipids and non-hydratable phospholipids, as well as, glycolipids, triglycerides, carbohydrates, sterols, free fatty acids, and carotenoids.

The separating step described above may be performed by centrifugation, filtration, sedimentation or a combination thereof. The flow-through cavitation device preferably comprises a multi-stage, hydrodynamic cavitation device or a spinning, rotor-stator hydrodynamic cavitation apparatus. The exposed interior surfaces of one or more components of the flow-through cavitation device may be made from or coated with a catalyst that comes into contact with the mixture of vegetable oil and removal reagents.

The production of food grade lecithin is increased as the vegetable oil is separated from the water dispersion of wax and phospholipids. The higher quantity of phospholipids produce a greater amount of lecithin, in particular food grade lecithin, with greater purity.

The flow-through design allows for high-volume throughput with greatly increased yields at a reduced cost. Prior art methods of cavitation are inefficient due to the use of other mechanisms to generate cavitation. Prior art methods of cavitation are also time consuming and more costly because they do not have the high volume throughput capability of the inventive method or even require batch processing with a high residence time.

The cavitation-assisted processing is accomplished through the use of a single or multi-stage, flow-through hydrodynamic cavitation device to create cavitation events in the fluid flow. Vapor compression and the formation of micro-jets accompany the implosion of the cavitation bubbles associated with the cavitation events or features. The collapse of the cavitation bubbles results in localized regions of increased pressure, increased temperature and vigorous mixing to refine the oil. The increased pressure and temperature excite phospholipid molecules contained in fluid layers surrounding the bubbles, thereby driving them into the water-phase. This action promotes formation of wax and phospholipids agglomerates, adsorption of metal-containing compounds, and other related reactions and processes.

The implosion of the bubbles results in the formation of deformed micro bubbles. When these deformed micro bubbles move into a reduced pressure zone, they become nuclei for cavitation bubbles in a downstream cavitation zone, enhancing the cavitation field density and lowering the cavitation threshold. Such enhancement further facilitates the formation of wax and phospholipids agglomerates and separation from the oil phase. This makes flow-through hydrodynamic cavitation devices especially suitable for dewaxing and refining oils.

The size of the cavitational features, i.e., bubbles, depends on the properties of the fluid flow, the design of the cavitational device, the flow velocity sustained by the pump, the temperature of the fluid flow, and other treatment conditions. In practice, the pump pressure is increased until a proper cavitation field is achieved. In addition to impacting the size, concentration and vapor composition of the cavities, the inlet pressure affects the composition of the processed medium. The desirable outcome is obtained by generating hydrodynamic cavitation having an optimal cavitation number and density consistently throughout the fluid flow. The preferred embodiment of the present invention optimizes the cavitation to efficiently dewax and refine oils by applying the most suitable pump pressure, selected from a range of 50-5,000 psi. Further, the efficiency of cavitation-assisted degumming is high for a wide range of temperatures, allowing for better preservation of unstable, valuable ingredients when dewaxing and refining at low temperatures.

Figure 18:
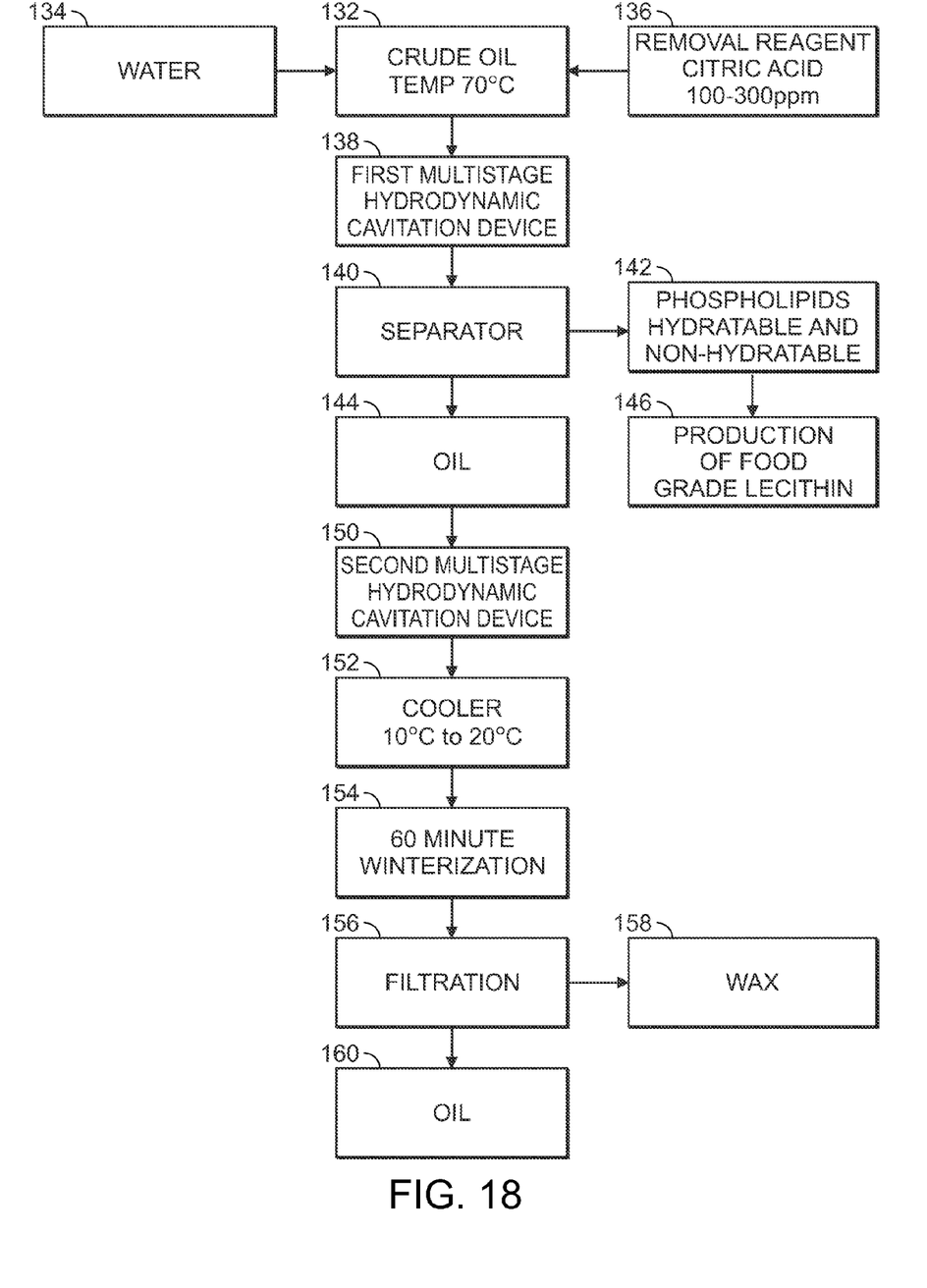
FIG. 18 is a flow chart illustrating a preferred embodiment of a two-step process of the inventive method.

FIG. 18 illustrates an alternate two-step process of the inventive method. The two-step process begins similar to the one-step process described above insofar as the crude oil 132 is mixed with water 134 and a removal reagent 136. In this two-step process, the removal reagent 136 is only intended to remove phospholipids. The phospholipid removal agent 136 is an acid, preferably phosphoric acid and/or citric acid as described above. The crude oil is provided at a temperature of about seventy degrees Celsius. The mixture of crude oil, water and phospholipid removal agent is subjected to a first cavitation process 138 and a multi-stage hydrodynamic cavitation device, preferably in one of the forms described herein. The cavitated initial process fluid is then sent to a separator 140 where the phospholipids 142 are separated from the oil 144.

The phospholipids 142 may contain both hydratable and non-hydratable phospholipids. These phospholipids may be used in the production of food grade lecithin 146 in a manner similar to that described above.

The separated oil 144 may then be mixed with a wax removal reagent 148. This wax removal reagent 148 includes water and preferably a basic compound, such as, sodium hydroxide (NaOH). This mixture of oil and wax removal reagent forms an intermediate process fluid. The intermediate process fluid is then subjected to a second cavitation process 150 in a multi-stage hydrodynamic cavitation device, preferably in one of the forms described herein. This cavitation device may be the same one used for first stage in quasi-batch processing or a second device in continuous processing. The cavitated intermediate process fluid is sent to a cooler 152 where it is cooled to a temperature of at least room temperature (20°-25° C.), but preferably in the range of 10°-15° C., or more preferably 5° C. The cooled and cavitated intermediate process fluid is then subjected to a winterization process 154 for a period of between thirty to sixty minutes. This winterization process 154 is performed as described elsewhere herein.

The winterized intermediate process fluid is then subjected to a filtration or similar process 156 to separate the crystallized wax 158 from the purified vegetable oil 160. As described elsewhere herein, the purified vegetable oil has preferably had most of its impurities removed.

The following examples are given for illustrating performance of the process of the present invention and should not be construed as a limitation on either the scope or spirit of the invention.

Example 1

Experimental Design

Feedstock:
Crude/water degummed sunflower oil from Argentina (supplied by Desmet Ballestra Argentina ("DBAr"));
Equipment:
Trials were conducted in the pilot facilities of Cavitation Technologies, Inc. ("CTI") in Chatsworth, Calif. (USA);
Samples:
All the samples, which were sent in to Desmet Ballestra Group ("DBG") R&D center for analysis, were processed through the nano-cavitation reactors during a series of cold refining trials. The sample numbers are given by CTI as continuation of the previous set of trials (see Lab Report 120113).

Nano-cold refining general procedure (as applied at CTI): Preheating of the sunflower oil to 180° F. (only for samples 15-17); addition of NaOH (as 10% aq. solution) and cooling of the mixture to 40° F. (4.4° C.); processing of the cold mixture through the nano-reactors (conditions not specified); maturation of the nano-processed mixture for a predetermined amount of time (no temp. control); and centrifugation of 'cold', maturated mixture (no temp. control during centrifugation).

Figure 14:
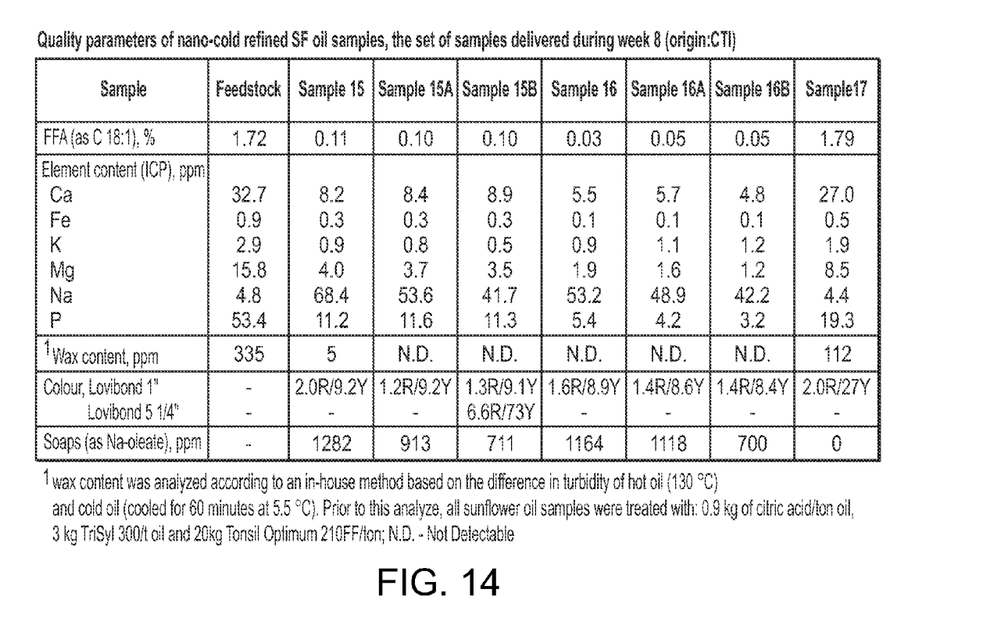
FIG. 14 is a table listing quality parameters for nano-cold refined sunflower oil samples.

Results:
As illustrated in FIG. 14, for feedstock, samples 15-16B and 17. There was less NaOH (close to the stoichiometrically amount required for complete FFA neutralization) added in these trials as compared to prior art techniques. Residual FFA was around 0.1% in samples 15, 15A and 15B and around 0.05% in samples 16,16A and 16B. Residual P-content was slightly higher compared to first set of samples, but still good degumming efficiency (especially in samples 16, 16A and 16B);

There were non-detectable waxes in most samples. It must be noted that for wax determination, samples first have to be bleached on lab-scale using 0.9 Kg of citric acid/ton oil, 3 Kg trisyl 300/ton oil, and 20 Kg tons/optimum 210 FF/ton oil. Since bleaching takes place at high temperature (above the melting point of waxes), it is not expected that waxes are removed. All nano-cold refined sunflower oil samples are 'brilliant' (after lab bleaching).

Example 2

Process Description

The nano-cavitation module was installed in the crude sunflower oil pipeline between the output of a hexane recovery system and the degumming centrifuge with the purpose of removing as much phosphorous as possible to increase Lecithin production and get low phosphorous sunflower oil for physical refining. In order to remove a greater quantity of gums, a solution of 100-300 ppm of citric acid is added to crude oil from the distillation and held in a maturation tank for 30/40 minutes, then 1-2% water is added "on line" and passed through the nano cavitator to go then to the centrifuge where gums are removed.

Results

Figure 15:
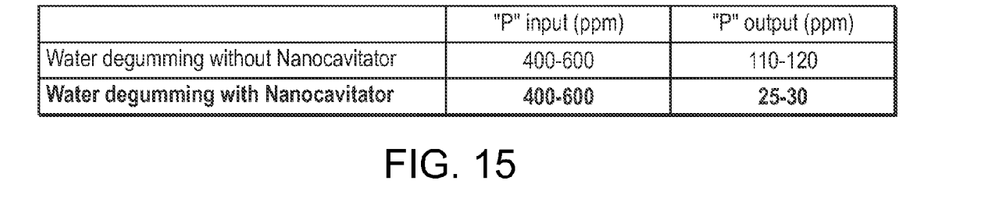
FIG. 15 is a table comparing phosphorous input and phosphorous output for water degumming performed with and without a nano-cavitator.
Figure 16:
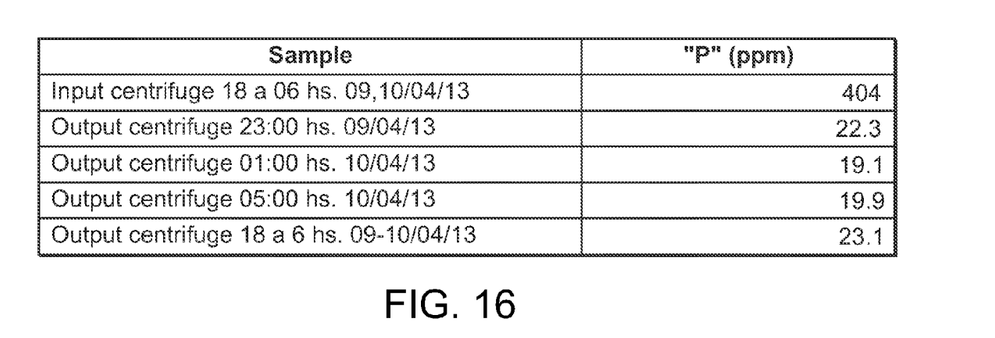
FIG. 16 is a table reporting phosphorous content for samples processed in a centrifuge.
Figure 17:
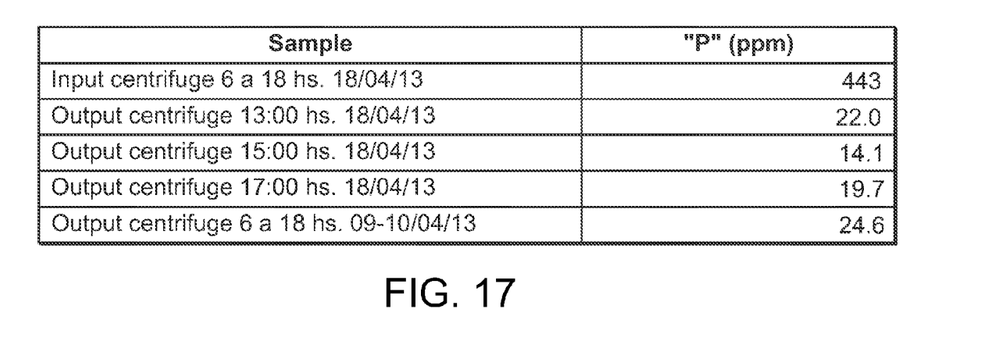
FIG. 17 is a table reporting phosphorous content for samples run through a centrifuge.

FIG. 15 is a comparative table showing the phosphorous in crude sunflower oil before (water degumming) and after processing in the nano cavitator. The reported values are averages of multiple process runs. To further illustrate this, FIGS. 16 and 17 provide some detailed values of phosphorous content measured at the outlet of the centrifuge.

Based on these results, it is believed that the inventive process will increase the lecithin yield and produce crude oil with low "P" content of average 20 ppm, ready for physical refining. The residual "P" for acid degumming without a nano cavitator is about 80/90 ppm.

As described above, hydrodynamic cavitation is the formation of vapor-filled cavities in the fluid flow, which is followed by bubble collapse in a high-pressure zone. In practice, the process is performed as follows: the fluidic flow is pumped into an inlet on the cavitation device. In localized zones, the flow velocity increases causing the fluid pressure to drop according to Bernoulli's law. This leads to the formation of bubbles filled with the vapors of compounds that boil under the given conditions. When the bubbles move past the low pressure zone, the pressure in the flow increases such that the bubbles collapse. This exposes the vapors within the bubbles and the surrounding medium to increased pressure and temperature, strong shearing forces, shock waves, acoustic vibration and electromagnetic irradiation. Such alteration of the medium results in reactions taking place within the collapsing bubbles and/or in the adjacent fluid layers. Preferred embodiments of the cavitation devices capable of achieving the objects of the present invention are disclosed in U.S. Pat. No. 7,762,715 and U.S. Pat. No. 8,042,989. The entirety of these applications is incorporated herein by this reference.

With reference to the attached drawing figures, a method for the creation of cavitation in a flow of oil and components for removal of wax and phospholipids resulting in localized spots of increased pressure, heat and vigorous mixing to refine oil is disclosed. The method uses a flow-through hydrodynamic cavitation apparatus to carry out removal of wax and phospholipids from oil. The intense local heat released due to the vapor compression and the formation of micro jets, which accompany the bubble implosion, activate molecules contained in adjacent layers of surrounding fluid and improve mass transfer, thereby promoting the target reactions.

A preferred flow-through cavitation apparatus should be fabricated of inert material, for example stainless steel. To enhance its resistance to corrosive agents, the inner surface can be coated with oxides, nitrides, ceramics, plastics, polytetrafluoroethylene (PTFE), nanodiamonds, nanotubes, and other suitable compounds, materials, composites, particles, nanoparticles and combination thereof. The apparatus can be optimized via hardening, anodizing and other technologies. In another embodiment, agents are immobilized onto the inserts and/or device's inner surface or are supported by catalizator, magnet, magnetic or other particles attached at a desired location. The cavitation apparatus can be provided with a filter, selective membrane or absorbent to afford even better removal of impurities.

Figure 2:
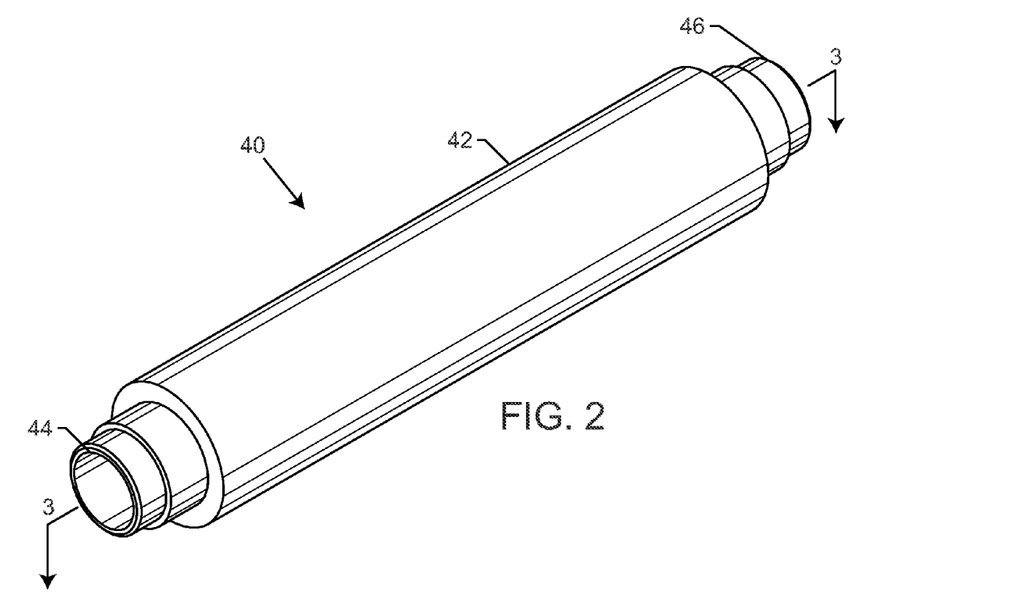
FIG. 2 is a perspective view a preferred embodiment of the multi-stage cavitation device.
Figure 3:
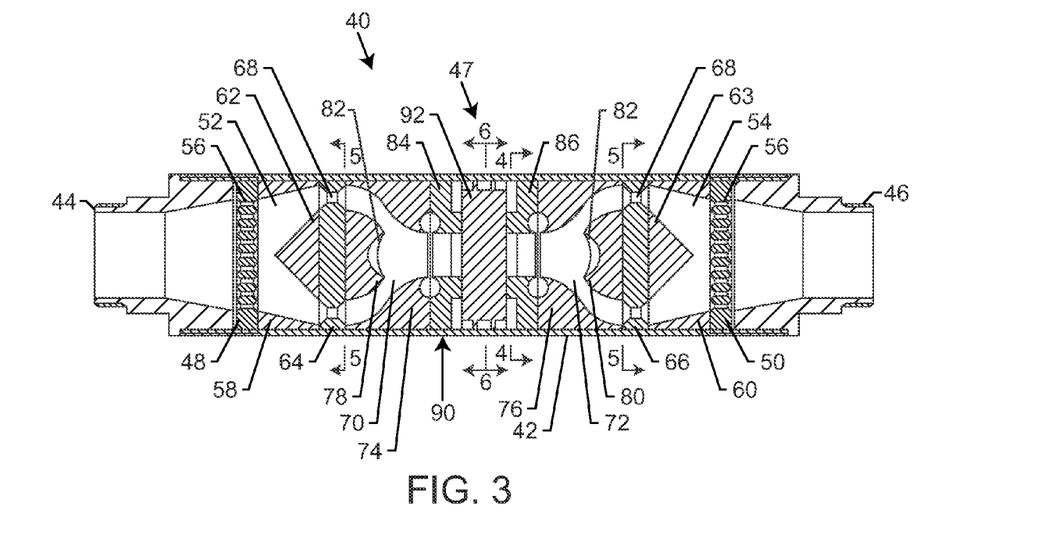
FIG. 3 is a cross-sectional view taken along line 2-2 of FIG. 2.

The flow-through cavitation device 40 depicted in FIGS. 2 and 3 is comprised of a steel housing 42, which is attached to inlet 44 and outlet 46 pipes for direct connection to an industrial pipeline (not shown). The device 40 preferably has a mirrored symmetry such that from the inlet 44 to a mid-point 47 is repeated in reverse from the mid-point 47 to an outlet 46. The following description will follow the mirrored symmetry and describe from both the inlet 44 and outlet 46 toward the mid-point 47 simultaneously.

Assuming flow from left to right, front and end disk multi-jet nozzles 48, 50 serve as the front and back walls of exterior working chambers 52, 54 and are located behind the inlet pipe 44 and in front of the outlet pipe 46. The multi-jet nozzles 48, 50 are equipped with constricting and expanding channels 56 that are distributed uniformly over the surfaces of the disks that are the multi-jet nozzles 48, 50. The working chambers 52, 54 are comprised of radial cones 58, 60 and central guide cones 62, 63, which are attached to radial multi-jet nozzles 64, 66. The radial multi-jet nozzles 64, 66 feature both constricting and expanding channels 68. The channels 68 are spread evenly over the radial perimeter surface of the nozzles 64, 66, which direct the flow to interior working chambers 70, 72.

Flow guides 74, 76 that direct the flowpath from the perimeter to a center of the device 40 bound the chambers 70, 72. The cross-section of the flow guides 74, 76 generally has an S-shape configuration. A hemi-spherical body 78, 80 with a top niche 82 is mounted in the working chambers 70, 72 against the multi-jet nozzle 64, 66. The turbulizer disk 84, 86 (FIG. 4) with curved guides 88 and central hole 89 is located behind the guides 74, 76 in vortex chamber 90. The vortex chamber 90 is formed of the inner wall of the housing 42 and a cylindrical body disposed in the center. The vortex chamber 90 directs the flow from the hole 89 of the front disk 84. The holes 89 in the disks 84, 86 are coaxial. Their diameters are equal to that of holes in the guides 74, 76. The mid-point 47 is within the vortex chamber 90.

Figure 4:
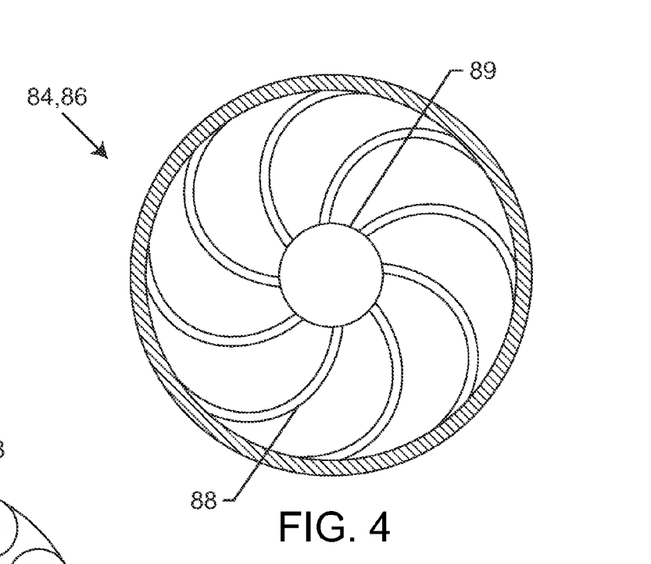
FIG. 4 is a cross-sectional view of the turbulizer disk taken along line 3-3 of FIG. 3.
Figure 5:
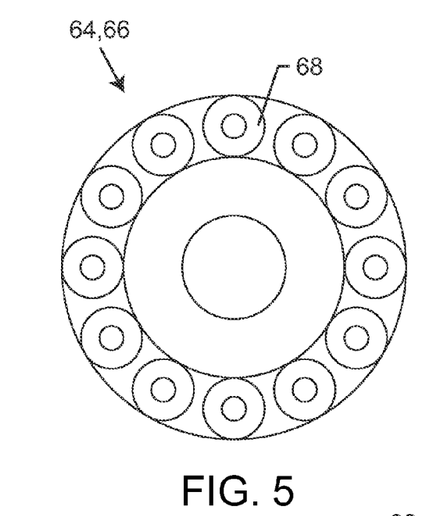
FIG. 5 is a cross-sectional view of the radial multi-jet nozzle taken along lines 4-4 of FIG. 3.
Figure 6:
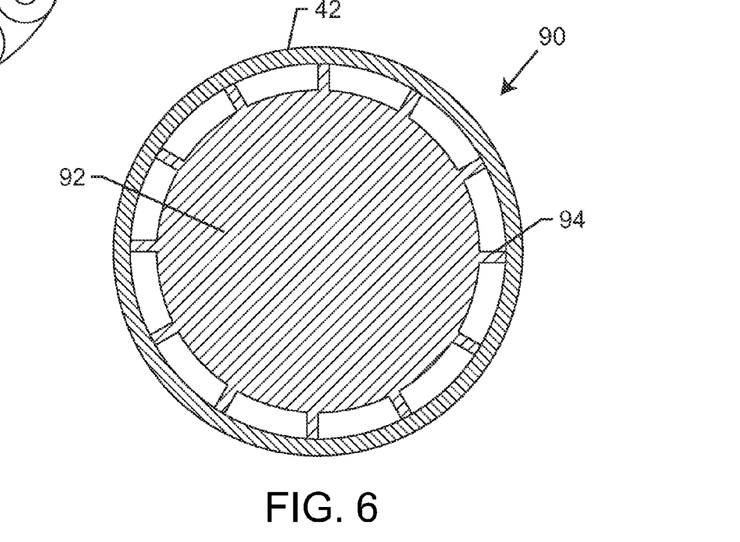
FIG. 6 is a cross-sectional view of the cylindrical body taken along lines 5-5 of FIG. 3.
Figure 7:
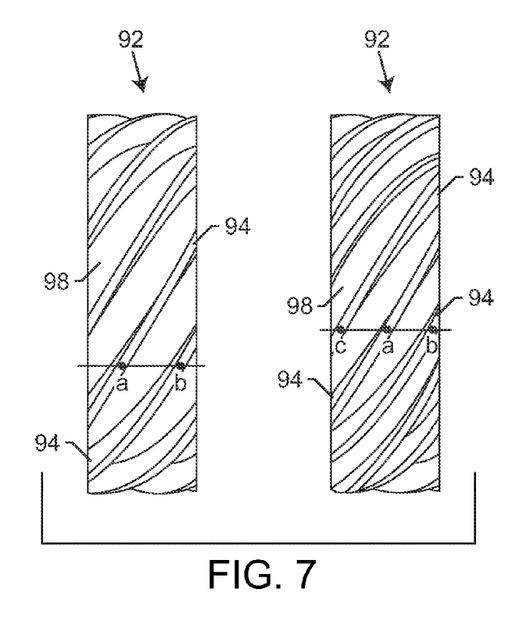
FIG. 7 is a side view of the cylindrical body.
Figure 8:
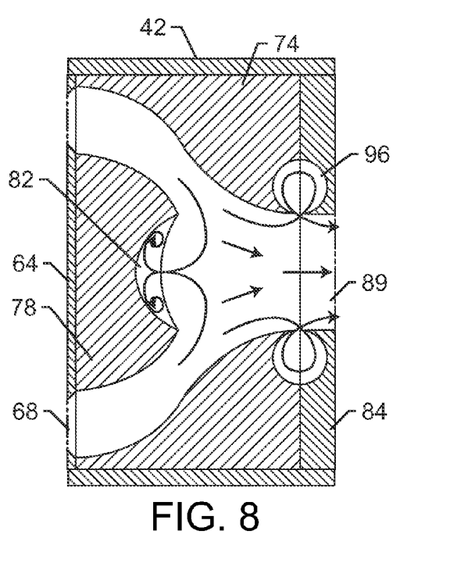
FIG. 8 is a close-up view of the front interior working chamber and toroidal vortex chamber illustrating fluid flow.
Figure 9:
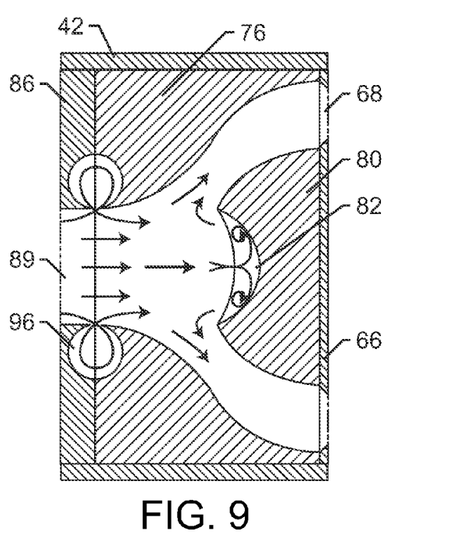
FIG. 9 is a close-up view of the back interior working chamber and toroidal vortex chamber illustrating fluid flow.
Figure 10:
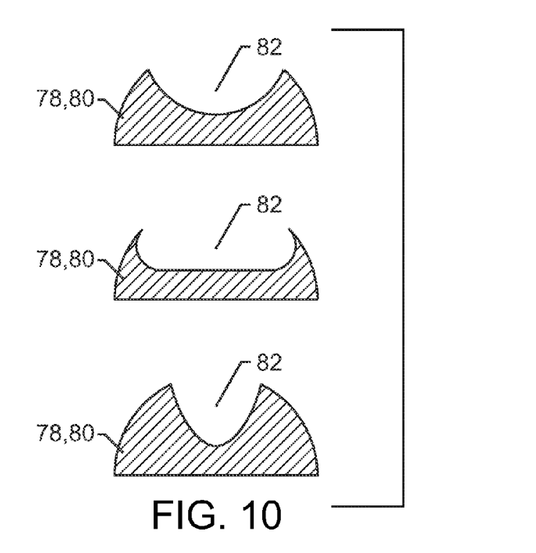
FIG. 10 is a cross-sectional view of various forms of the hemi-spherical body.

FIG. 4 is a diagram that shows disks 84, 86 with curved guides 88 and central holes 89. An interior side of the radial multi-jet nozzles 64, 66 is depicted in FIG. 5. The channels 68 let out into the working chambers 70, 72 housing the hemi-spherical body 68, 80 with the top niche 82. FIG. 6 shows a cross-sectional view of the cylindrical body 92, which is provided with the superficial perimeter guides 94 that serve as the channels for fluid flow. FIG. 7 is a drawing of a preferred embodiment for the guides 94 of the cylindrical body 92. FIGS. 8 and 9 depict the junction between the working chambers 70, 72 and the disks 84, 86 and illustrate fluid flow. At the junction between the guides 74, 76 and the disks 84, 86 are toroidal vortex chambers 96 which are connected to the holes 89 and working chambers 70, 72. FIG. 10 is a simplified schematic illustration showing various embodiments for the niche 82: a hemi-sphere, a toroid, and a parabola.

This embodiment of the flow-through cavitation device (FIG. 3) operates as follows. Fluid, for example, a rough disperse emulsion of oil and components for removal of wax and phospholipids, is pumped in the inlet pipe 44. The fluid moves to the multi-jet nozzle 48 and passes through its channels 56, which have both constrictions and expansions. Flowing through the channels 56 causes the formation of vortices, detached flows and cavitation. Particles of the emulsion become subjected to shear forces, and emulsion quality improves. When cavitation bubbles reach the working chamber 52 they pulsate and collapse. The bubble implosion results in increased pressure and temperature and formation of local jets that act on the emulsion particles, further improving the emulsion homogeny. Then the flow moves in a converging cone formed by the radial cone 58 and the central cone 62 that is mounted on the radial multi-jet nozzle 64. The flow is accelerated as it passes through the converging cone and then enters the channels 68, which possess both constrictions and expansions to generate vortices, detached flows and cavitation in the fluid flow.

After passing through the radial multi-jet nozzle 64, the flow moves into the interior working chamber 70 where the cavitation bubbles pulsate and implode. When fluid flow moves down along the surface of the semi-spherical body 78 it falls off the sharp edges of the top niche 82 generating toroidal vortices and a cavitation zone within the end of the working chamber 70. This cavitation field is characterized by a high intensity and a large cavity concentration. The end of the flow guide 74 is shaped as a constricting nozzle. The hole 89 in the disk 84 is shaped as an expanding nozzle in the beginning and a toroidal resonator 96 is positioned in the constrict location.

When the fluid flows along the place of the attachment of the flow guide 74 to the disk 84 it enters the ring grooves or toroidal resonator 96. The working principle of the toroidal resonator 96 is based on a high sensitivity of an symmetric flow to a side pressure. Changing pressure at the jet origination point will result in angular alteration of the fluid flow. The fluid is forced off the toroidal resonator 96 by discrete portions, which generates dynamic pulsations, vortices and cavitation. The frequency of a toroidal resonator depends on its diameter (Agranat et al., 1987).

The flow moves out of the working chamber 70, accelerating due to passing through the hole 89 in the front disk 84 and then enters channels located between the guides 88 on the front disk 84 in the vortex chamber 90. To maintain the fluid flow in a vortex state and to prevent it from moving in a plane parallel to the cavitator central axis, the guides 94 are provided on the cylinder 92 surface to direct the flow into channels 98 and sustain the spiral flow state (FIG. 6). In the vortex chamber 90, cavitation bubbles are acted upon by centrifugal and Coriolis forces. As a result, the fluidic pressure rises and the bubbles collapse.

The direction of the flow moving down the channels 98 formed by the guides 94 provided on the cylinder 92 surface is determined by the pitch angle with respect to the central axis of the cavitation device 40. In order to prevent flow from following the straight path, certain requirements must be met. Lines that are parallel to the main axis and go through any point on the surface of a guide 94 should intersect the adjacent guide. In FIG. 7, a straight line parallel to the central axis, goes through point a on the guide 94 and intersects the adjacent guide 94 at point b. The more guides that are intersected by a straight line (points c, a and b), the more thoroughly the flow is twirled in the vortex chamber 90. The number of guides 94 that may be intersected by one line is limited due to the requirement that the total area of the guide channels 98 be equal to the area of the central hole 89 of the disks 84, 86. The total cross-sectional area of the channels 98 can be calculated by multiplying the number of channels by the height and width.

After passing through the channels 98 the fluid flow moves over the surface of the vortex guides 88 and enters the hole 89 in the rear disk 86. This redirects the flow along the central axis of the device 40. When the fluid flow passes the rear disk 86 and rear guide 76 it enters the rear toroidal resonator 96, the working principle of which is described above. The accelerated flow falls on the top niche 82 of the rear hemi-spherical body 80, forming pulsating toroidal vortex and cavitations' zone (Dudzinskii and Nazarenko, 1996; Nazarenko, 1998). The pulsation frequency and the cavitation zone shape depend on the fluid properties, flow rate and the niche shape. The preferred embodiments for the niche 82 are described above.

The fluidic flow passes through the region of the toroidal resonator 96 and niche 82 and enters the working chamber 72 bounded by the rear guide 76 inner wall and the rear semi-spherical body 80, which direct the flow from the center to the perimeter. The cavities detached from the toroidal flow region implode in the working chamber 72. After passing the working chamber 72, the fluid flow enters channels 68 of the rear radial multi-jet nozzle 66 provided with the constrictions and the expansions. This generates vortices, detached flow jets and cavitation. When the fluid flow moves in the working chamber 54, the flow velocity decreases, the pressure goes up, and pulsation and implosion of the bubbles take place. Then the flow passes through the constrictions and the expansions 56 of the rear multi-jet nozzle 50 followed by generation of vortices, detached flow jets and cavitation. The particles of emulsion that undergo the cavitation process are reduced in size and their surfaces are modified. The cavitation bubbles pulse and implode within the working chamber 54, leading to shear force and local jet formation. Then the fluid flow exits the cavitation device through the outlet pipe 46.

This preferred embodiment of the device provides at least eleven cavitation zones: (1) the front multi-jet nozzle 48; (2) the front, radial multi-jet nozzle 64; (3) the top niche 82 in the front hemi-spherical body 78; (4) the front toroidal vortex chamber 96; (5) the hole 89 and curved guides 88 of the front disk 84; (6) the vortex chamber 90; (7) the hole 89 and curved guides 88 of the rear disk 86; (8) the rear toroidal vortex chamber 96; (9) the top niche 82 in the rear hemi-spherical body 80; (10) the rear, radial multi-jet nozzle 66; and (11) the rear-end multi-jet nozzle 50. The device design allows for two, four, six or even more mirror-symmetric cavitation regions. The plane of mirror symmetry passes through the mid-point 47 of the vortex chamber 90 located between the disks 84, 86.

One of the numerous advantages of the preferred embodiment is its versatility in respect to fluid feeding. The device 40 can be connected to a pump at either end and is especially suitable for technological applications with a demand for reversing flow direction. The device 40 can be incorporated in a pipeline without any risk of confusing inlet with outlet. The main benefit of the present flow-through cavitation device 40 is the interface of the vortex and cavitation generating zones with the higher-pressure working chambers for the cavitation bubbles' implosion.

Figure 11:
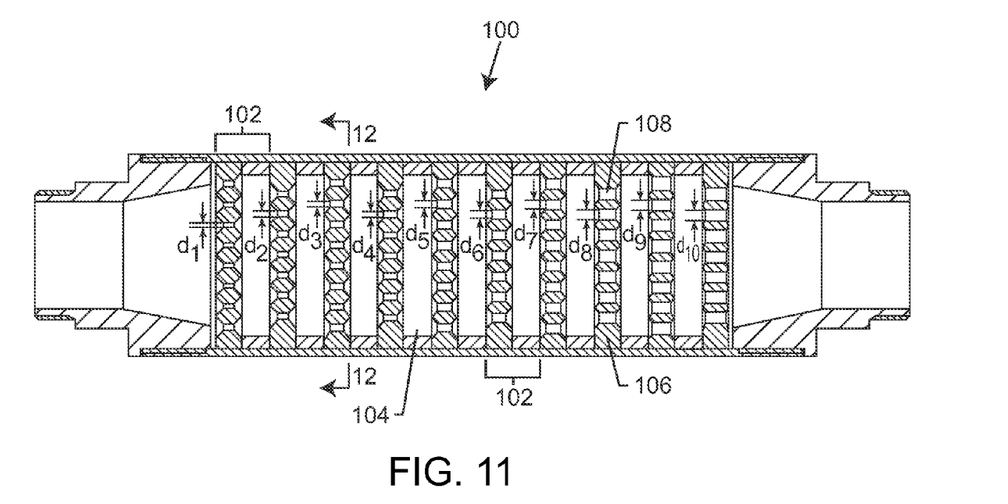
FIG. 11 is a cross-sectional view of another preferred embodiment of the multi-stage cavitation device.
Figure 12:
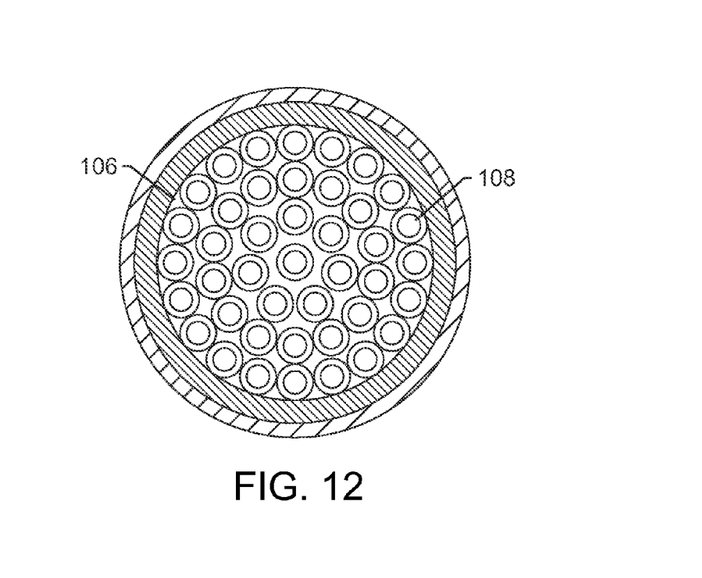
FIG. 12 is a cross-sectional view taken along line 12-12 of FIG. 11.

FIGS. 11 and 12 illustrate an alternate embodiment for a flow-through multi-stage cavitation system 100 that provides as many as ten zones 102 for generation and collapse of cavitation bubbles and is comprised of ten identical working chambers 104 and ten multi-jet nozzles 106 that differ in respect to the cross-sectional passage areas created by their channels 108.

When fluid is pumped into the cavitation device 100 through a displacement pump or other means, the flow rate is the same within the identical, sequentially located multi-jet nozzle channels 108. Thus, it is possible to lower the fluid flow rate within the channels of nearby downstream multi-jet nozzles, while keeping the cavitation at the same level. When the fluid flow passes through the front multi-jet nozzle 106 and the working chamber 104, the cavities implode and the fluid's temperature rises. The increased temperature and amplification of the nuclei facilitate the onset of cavitation events in downstream cavitation zones. Therefore, the same cavitation number and the same cavitation bubble concentration can be achieved within downstream zones with the lower flow velocity inside the nozzle channels 108.

During multi-stage fluid processing the hydraulic resistance is reduced by meeting the following condition: The cross-sectional channel area ($S_n$) of each multi-jet nozzle is less than that of the next multi-jet nozzle ($S_{n+1}$) following the flowpath, according to the equation: $1.0 \leq S_{n+1}/S_n \leq 1.1$, where n=1, 2, 3, 4, 5, 6, 7, 8 or 9. This helps save energy required for pumping a fluid flow through the multi-zone cavitation system. To scale back the cavitation device parts, for example, the multi-jet nozzle 106, it is necessary to place the channels 108 for fluid passage as close as possible. The number of the channels 108 of the multi-jet nozzle 106 is limited by the ratio of the total area of the largest cross-sectional openings of the channels ($S_d$) to the surface area of the multi-jet nozzle ($S_D$): $D_d/S_D \leq 0.8$, where $$S_d = \sum_{i=1}^{k} S_i$$

(k is the number of channels of the multi-jet nozzle; $S_i = \pi d_i^2/4$, where $d_i$ is the largest diameter of the channels 1, and $S_D = \pi D^2/4$, where D is the multi-jet nozzle diameter.

In either embodiment handling a multi-component fluid, the composition of the cavitation bubble vapors is not uniform. The cavities are enriched with the vapors of the compound(s) that are most volatile under the given conditions. The bubble implosion releases energy that drives chemical reactions and/or warms up the fluid. The processed matter contains the products of these reactions, the newly formed chemical compounds. The size of the cavities depends on the nature of the fluid under the treatment, the engineering design of the cavitation device and other conditions, such as the velocity of a flow sustained by a pump. In practice, the pump pressure is increased until a proper intensity of the cavitation field is achieved. In addition to determining the size, concentration and composition of the bubbles, and, as a consequence, the amount of released energy, the inlet pressure governs the outcome of the chemical reactions. The faster the flow moves, the smaller the cavitation number. A lower cavitation number (especially when less than one) implies a high degree of cavitation. The preferred embodiment of the present invention optimizes the cavitation to perform uniform alteration of fluids by applying the most suitable pump pressure. If too much energy is applied or the treatment time is too long, then the processing cost goes up. By applying hydrodynamic cavitation at a pump pressure designed to generate cavitation and chemical conversion evenly throughout the fluid, the change in physical and chemical properties takes place and the desirable outcome is obtained.

Figure 13:
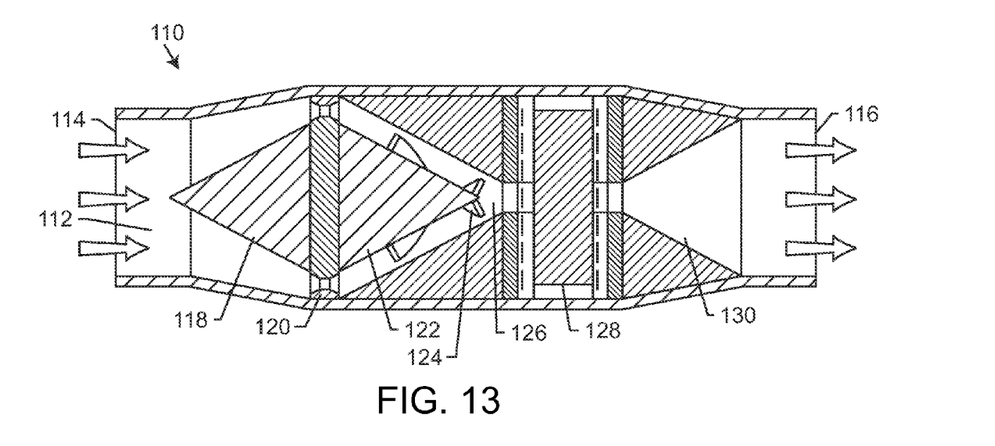
FIG. 13 is a cross-sectional view of another preferred embodiment of the multi-stage cavitation device.

As illustrated in FIG. 13, another preferred embodiment of the cavitation device 20 includes a multi-stage cavitation generator 110 as described in U.S. Pat. No. 7,762,715. The cavitation generator 110 has a flow path 112 between an inlet 114 and an outlet 116. The flow path 112 has various structures including an inlet cone 118, a multi-jet nozzle 120, a guide cone 122 featuring spiral guides 124, a working chamber 126, a vortex generator 128, and an atomizing cone 130. The configuration and operation of the generator 110, including the multi-jet nozzle 120 and vortex generator 128, is as described in U.S. Pat. No. 7,762,715.

The devices depicted in the FIGS. 2-13 are used for carrying into effect the method, according to the present invention. In accordance with the present invention, the fluid can be treated either continuously or periodically, by passing through the multi-stage devices 40, 100, 110 comprised of the vortice and bubble generating zones, as well as the higher-pressure working chambers. The systems can be placed anywhere around a production site, oil refining column or any other facility. The device may be fixed in position or movable. Placement of one device may be combined with the placement of another device in series or parallel. In practice, it is necessary to consider the cost of the device, its production capacity and operation and maintenance expenses. It should be emphasized, that an operator of the cavitation device is not required to wear the high performance safety products for hearing protection, such as earmuffs or earplugs, as it would be in a case of a high frequency acoustic cavitation.

The implosion of the cavitation bubbles results in the formation of numerous micro bubbles. Both the pressure and the temperature of the vapor contained within these bubbles are significant. If the fluid, which is enriched with these bubbles, moves to a lower-pressure zone, the bubbles will play the role of nuclei and expand enhancing the cavitation field intensity (Zhang and Chai, 2001). The repeated multiplication, expansion and implosion of the cavities lower the cavitation threshold. The bubbles grow from the nuclei, whose volume is larger than that of the originally present nuclei. This intensifies processing and allows for the carrying out of selective chemical reactions. This makes the present device unique and especially suitable for treatment of multi-component viscous fluids such as vegetable oils of a high economical value.

With sonic and ultrasonic radiation, the results are mixed, unless cavitation is uniform throughout the liquid. However, creating an even acoustic cavitation in large commercial tanks is a particular challenge. The present device achieves prompt alteration of fluids through using the multi-stage cavitation. The cavitation employed in accordance with the preferred embodiment of the present invention is achieved with a pump pressure selected from the range of approximately 50-5,000 psi. The optimal pressure produces a sufficient amount of cavities to achieve a high degree of treatment. However, as one familiar in the art can imagine, different fluids require different energies achieved through cavitation in order for their alteration to proceed. Therefore, the range of 50-5,000 psi is in no way limited for using the present invention. Energy released because of bubble implosion during flow-through hydrodynamic cavitation processing activates molecules forcing them to react and form new compounds. The result is an upgraded product of higher commercial value whose components are easier to handle.

The size of the cavitation bubbles depends on the fluidic mixture properties, design of the cavitation device, the flow velocity sustained by a pump, temperature and other conditions. In practice, the pump pressure is increased until the required level of cavitation is achieved. Inlet pressure affects the size, concentration and composition of the bubbles and, thus, the composition of the processed oil. Preferably the cavitation is optimized to efficiently purify oil by applying the most suitable pressure. The desirable outcome is obtained by generating hydrodynamic cavitation with an optimal cavitation number and density consistent throughout the flow.

The flow-through hydrodynamic apparatuses are designed for the express purification of large volumes of oil. The apparatuses can be placed sequentially or assembled in skid systems to scale up the capacity. The placement of one device may be combined with the placement of another one. The hydrodynamic cavitation-assisted treatment of oil can be repeated as many times as needed to achieve the desired result. The implosion of cavities results in the formation of deformed micro bubbles, which become nuclei after moving into the reduced pressure zone, enhancing the cavitation field density and lowering the cavitation threshold. This makes the multi-stage cavitation apparatus especially suitable for high-quality oil refining. The apparatuses can be easily mounted and transported, making them suitable for field and remote locations. In practice, it is necessary to consider a device's cost, its production capacity and the subsequent energy, maintenance and operation cost. An operator of a hydrodynamic cavitation apparatus is not required to wear hearing protection, as one would be in the case of an acoustic cavitation apparatus.

A practical approach to the best process outcome is to set an inlet pressure that provides enough bubble implosion energy for mixing oil and components for removal of wax and phospholipids. The amount of removal reagents added to the oil depends on the contamination level but is preferably relatively small. Oil and removal reagents can be cavitated at the ambient temperature or can be preheated or cooled. Oil and removal reagents are preferably cavitated at a pump pressure of 25-5,000 psi. The oil may also be subjected to cavitation in the absence of removal reagents followed by cavitation-assisted purification in the presence of suitable removal reagents. One skilled in the art will understand that different oils require different conditions for conducting efficient purification and the 25-5,000 psi pump pressure does not limit the application of this invention.

The flow-through cavitation apparatus should be fabricated of inert materials. To enhance the resistance to phosphoric acid and other corrosive agents, the inner parts can be coated with ceramics, plastics, polytetrafluoro-ethylene, nanodiamonds and other suitable materials and their composites. The device's properties can be optimized via hardening, anodizing, bonding, and other technologies. In another embodiment, lipase and/or other enzymes can be disposed on the device's inner surface or are supported by magnetic or other particles that can be attached at a desired location. The cavitation device can be equipped with a selective membrane to provide even better removal of wax and phosphatides and other impurities via ultrafiltration.

The cavitation apparatus can be placed at an oil pressing site, nearby a storage container or attached to such a structure. Yet another possibility exists, in which the device is not fixed but movable. Additional lines and skid systems can be assembled to scale up the degumming capacity. Placement of one device may be combined with the placement of another one. These systems can be easily mounted and transported, making them suitable for field and remote locations. In practice, it is necessary to take into account the device cost, its production capacity and the subsequent energy, maintenance and operation cost.

A preferred example of an efficient cavitation apparatus, which is especially suitable for dewaxing and degumming, is an assembly comprised of two 7-stage cavitation reactors installed in-line sequentially at a pump pressure of 800-1250 psi. Preferably, the pump pressure of the first reactor is about 1,250 psi and that of the second reactor is approximately 625 psi, and the system's flow rate is about 20 gallons per minute.

The present invention creates beneficial conditions that cannot be duplicated by the prior art. The process efficiency is high and can be enhanced by consecutive applications of high pressure, elevated heat, turbulence and vigorous mixing applied in a flow-through manner within a short period. The preferred embodiments of the present invention apply optimized levels of both pressure and heat by the controlled flow-through hydrodynamic cavitation. The process is independent of external conditions and provides a highly effective means of dewaxing, degumming, refining, removal of both hydratable phosphatides and non-hydratable phosphatides, and other impurities, and changing oil composition and properties uniformly throughout the flow.

Important economic benefits are experienced through the use of the present invention. The optimized usage of a flow-through hydrodynamic cavitation serves to lower equipment, handling and energy costs, as it improves the efficiency of refining and especially dewaxing and degumming. Cavitation-assisted dewaxing and degumming presents fewer environmental problems and is economically feasible. The combination of technological simplicity and economic feasibility makes the cavitation-assisted dewaxing and degumming attractive for both small and large oil and food grade lecithin production.

The beneficial effects gained through the present invention cannot be achieved through sonic or ultrasonic cavitation, rotor-stator cavitation or other prior art cavitation methods because the conditions created by the flow-through cavitation device cannot be duplicated by other means. In sound-induced cavitation, the bubbles form a barrier to further transmission and attenuate the sound waves, limiting the effective range of the induced sound waves. Furthermore, the ultrasonic irradiation modifies media at the specific locations, depending on the frequency and source power. The present invention overcomes these limitations, purifying oil in a uniform manner. This invention efficiently degums oil by supplying energy sufficient to drive these processes and reactions. Thus, the present invention provides a better means of refining and producing gums of superior quality.

The preferred embodiments of the present invention are disclosed herein. However, it should be understood that the disclosed embodiments are merely exemplary of the invention, which may be embodied in various forms. Therefore, the details disclosed herein are not to be interpreted as limiting, but merely as informative of the invention and as a basis for teaching one skilled in the art how to make and how to use the present invention.

Although several embodiments have been described in detail for purposes of illustration, various modifications may be made without departing from the scope and spirit of the invention. Accordingly, the invention is not to be limited, except as by the appended claims.

What is claimed is:

1. A two-step process for removing impurities from crude vegetable oil, comprising the steps of:
   mixing the crude vegetable oil with phospholipid removal agents so as to form an initial process fluid;
   subjecting the initial process fluid to a first hydrodynamic cavitation treatment;
   separating the cavitated initial process fluid into phospholipids and an intermediate process vegetable oil;
   mixing the intermediate process vegetable oil with a wax removal reagent so as to form an intermediate process fluid;
   subjecting the intermediate process fluid to a second hydrodynamic cavitation treatment;
   cooling the cavitated intermediate process fluid to at least twenty-five degrees Celsius;
   subjecting the cavitated intermediate process fluid to a winterization process for between thirty and sixty minutes; and
   separating the winterized intermediate process fluid into waxes and purified vegetable oil.

2. The process of claim 1, wherein the phospholipids comprise hydratable phospholipids and non-hydratable phospholipids, phosphorous, glycolipids, triglycerides, carbohydrates, sterols, free fatty acids, and carotenoids.

3. The process of claim 1, further comprising the steps of:
   transporting the phospholipids to a drying system;

drying the phospholipids to remove moisture and leave dried phospholipids; and producing lecithin from the dried phospholipids.

4. The process of claim 1, wherein the phospholipid removal reagents comprise an acid solution and the wax removal reagents comprise a base solution.

5. The process of claim 4, wherein the phospholipid removal reagents comprise phosphoric acid and/or citric acid.

6. The process of claim 4, wherein the wax removal reagents comprise water and/or sodium hydroxide.

* * * * *